US005138593A

United States Patent [19]

Yokoyama

[11] Patent Number: 5,138,593

[45] Date of Patent: Aug. 11, 1992

[54] VIBRATION CONTROL FOR AN OPTICAL PICKUP ACTUATOR DRIVING DEVICE

[75] Inventor: Kenji Yokoyama, Hamamatsu, Japan

[73] Assignee: Yamaha Corporation, Hamamatsu, Japan

[21] Appl. No.: 772,598

[22] Filed: Oct. 3, 1991

Related U.S. Application Data

[63] Continuation of Ser. No. 232,290, Aug. 15, 1988, abandoned.

[30] Foreign Application Priority Data

Aug. 18, 1987 [JP] Japan ............................ 62-204546

[51] Int. Cl.[5] ........................................ G11B 7/09

[52] U.S. Cl. ........................ 369/44.29; 369/44.32; 369/54

[58] Field of Search ............... 369/44.25, 44.28, 44.29, 369/44.32, 44.35, 32–33, 53–55; 250/201.1, 201.5

[56] References Cited

U.S. PATENT DOCUMENTS 4,698,795 10/1987 Yoshio ............................ 369/44.28
4,769,803 9/1988 Yamamiya .................. 369/44.28 X
4,773,055 9/1988 Gijzen et al. ................ 369/44.32 X
4,855,982 8/1989 Orlicki et al. .................... 369/32 X

*Primary Examiner*—Roy N. Envall, Jr.
*Assistant Examiner*—W. R. Young
*Attorney, Agent, or Firm*—Spensley Horn Jubas & Lubitz

[57] ABSTRACT

A device for driving an actuator for tracking-controlling, focus-controlling or otherwise controlling an optical pickup in an optical type recording and/or reproducing device such as a CD (Compact Disc) player, a CD-V (Compact Disc with video) player and an LV (laser vision) player comprises an actuator driving coil for moving an actuator of an optical pickup, a sensor for detecting movement of the actuator, a first servo loop for feeding back detection output of a reflected beam from a recording medium, and a second servo loop for feeding back a detection output of the sensor to the actuator driving coil. The second servo loop functions to restrain an arbitrary movement of the actuator which is not following a command by the first servo loop whereby unnecessary vibration due to transient response is reduced and the actuator becomes easier to handle.

3 Claims, 4 Drawing Sheets

PRIOR ART

VIBRATION CONTROL FOR AN OPTICAL PICKUP ACTUATOR DRIVING DEVICE

This is a continuation of application Ser. No. 232,290 filed on Aug. 15, 1988, now abandoned.

BACKGROUND OF THE INVENTION

This invention relates to a device for driving an actuator for tracking-controlling, focus-controlling or otherwise controlling an optical pickup in an optical type recording and reproducing device such as a CD (Compact Disc) player, a CD-V (Compact Disc with video) player and an LV (laser vision) player and, more particularly, to a device of this type which has reduced unnecessary vibration occurring due to transient response of an optical pickup and thereby facilitates control of the actuator.

For reading a signal recorded on a disc, an optical pickup of an optical type disc playback device generally comprises actuators performing controls including tracking control, focus control and tangential control. These actuators are generally constructed of coils and magnetic circuits and each is driven by a servo system based on a detection of an error signal relative to a normal state in response to a detected signal from the disc so as to control a beam spot to be correctly positioned on the disc.

As an example of such an optical pickup devices is one having a symmetrical drive type tracking actuator as shown in a plan in FIG. 2. This optical pickup 10 comprises a lens support 12 which is horizontally rotatably supported on a rotation shaft 14. An objective lens 16 is fixed at an end portion of the lens support 12. This objective lens 16 swings clockwise and counterclockwise in accordance with the pivoting of the lens support 12 in the horizontal direction and tracking thereby is performed. Cores 18 and 20 are formed on both sides of the lens support 12 and tracking coils 22 and 24 are wound on these cores 18 and 20. The cores 18 and 20 are separated from each other by the lens support 12 so that mutual inductance is not generated between the tracking coils 22 and 24. To a stationary portion of the optical pickup 10 is secured magnets 26 and 28 opposite to the cores 18 and 20. To both sides of the lens support 12 is secured a damper 30 which is made of rubber or other material and formed substantially in the shape of "8". Annular portions 30*a* and 30*b* are formed in both end portions of the damper 30 and damper supports 32 and 34 fixedly provided on a stationary portion of the optical pickup 10 are fitted in the annular portions 30*a* and 30*b* to support the damper 30.

By applying a tracking error signal to the tracking coils 22 and 24, the lens support 12 is pivoted by an angle corresponding to the error signal about the rotation shaft 14 thereby causing the objective lens to swing clockwise or counterclockwise to perform tracking.

FIG. 3 shows a prior art tracking actuator driving device employing the optical pickup of FIG. 2. A disc 44 is driven and rotated by a spindle motor 46. In the optical pickup 10, laser beam 38 produced by a laser diode 36 is radiated on the recording surface of the disc 44 through a grating 40, a beam splitter 42 and an objective lens 16 and the reflected beam is received by a four split photo-detector 50 through the objective lens 16, the beam splitter 42 and a cylindrical lens 48.

Outputs of the four split photo-detector 50 on diagonals are added together. These diagonal sum signals are further added by an adder 52 whereby an RF signal is produced and reproduction of a signal is made.

These diagonal sum signals are also supplied to a differential amplifier 54 and a tracking error signal is produced. This tracking error signal is supplied to tracking coils 24 and 22 connected in series to each other through a compensation amplifier 56, a tracking loop switch 58 and a drive amplifier 60 to pivot the lens support 12 and thereby cause the objective lens 16 to swing clockwise or counterclockwise to perform tracking control.

Since the actuator of the optical pickup comprises an objective lens and other elements having a relatively large mass, it has to adopt a design which inevitably produces vibrations due to transient response of the optical pickup. For reducing vibrations due to a transient response, the damper 30 as shown in FIG. 2 is generally used. This damper 30, however, cannot sufficiently reduce vibrations but, rather, makes resonance characteristic conspicuous in frequency response (open loop) as shown in FIG. 4. This resonance characteristic is a factor which is hard to control and makes the tracking servo unstable and is called unnecessary vibration characteristic. For removing this unnecessary vibration characteristic, the prior art device employs a servo system using a detection signal from the disc and also employs the phase compensation amplifier 56 in its servo loop for phase-compensating.

For performing this phase compensation, complex parameters forming this resonance characteristic must be analyzed by using a large sized computer and a complicated phase compensation must be applied in accordance with result of the analysis by the computer. It is however extremely difficult to analyze these parameters accurately and realize an accurate phase compensation in accordance with these parameters.

Even if the parameters are analyzed accurately and an accurate phase compensation is applied in accordance with these parameters, characteristics of the conductor of a coil, compensation circuit and damper undergo change due to external conditions such as ambient temperature which changes with a wide range between −25° C. and +75° C. as well as aging with resulting change in the frequency response as shown in FIG. 4, so that it is extremely difficult to maintain an optimum phase compensation constantly. Besides, phase compensation designed to be optimum under some characteristics conditions sometimes becomes a factor which adversely affects the phase characteristics under other characteristics conditions.

The servo loop shown in FIG. 3 works on the condition that there exists reflected laser beam. If, therefore, a reflected beam is not obtained due to scratch, dust or the like on the recorded surface of the disc, the servo loop is virtually cut off and there will occur a case where the lens support 12 supported by the damper 30 is put in a free vibration state and also in a resonant state with a result that the lens support 12 vibrates at an abnormal amplitude (this may also be called a kind of unnecessary vibration). Such vibration tends to give rise to inconvenience that, when the servo loop resumes its operation after reflected beam is obtained again, a wrong track, i.e., a track which is different from one which was being traced before interruption of the reflected beam, is caught by the optical pickup. This makes the tracking control even more difficult. The above described phenomenon occurs also when the servo loop is cut off by turning off the tracking loop switch 58 such as when compulsory moving of the optical pickup such as search is made or when track jump is performed by generating a jump pulse from a jump pulse generator 62 in FIG. 3.

It is, therefore, an object of the invention to provide an actuator driving circuit for an optical pickup which has eliminated the above described problems of the prior art device and is capable of reducing unnecessary vibration due to transient response of the optical pickup and thereby facilitating control of the actuator with a relatively simple structure.

SUMMARY OF THE INVENTION

The optical pickup actuator driving device for achieving the above described object of the invention is characterized in that it comprises an actuator driving coil for moving an actuator of an optical pickup, a sensor for detecting movement of the actuator, a first servo loop for feeding back detection output of a reflected beam from a recording medium, and a second servo loop for feeding back detection output of the sensor to the actuator driving coil.

According to the invention, the second servo loop functions to restrain an arbitrary movement of the actuator which is not following a command by the first servo loop and, accordingly, the unnecessary vibration due to transient response is reduced and the actuator becomes easier to handle.

Since the resonance characteristic of the frequency response are mitigated and the frequency response becomes less susceptible to external conditions such as ambient temperature and aging, an excellent frequency response can constantly be maintained.

Further, according to the invention, the phase characteristic curve turns more gradual than in the prior art device so that phase compensation can be made in a simpler manner.

Since the second servo loop functions constantly, even when reflected beam is not available due to scratch or dust on the disc, free vibration of the damper is prevented and, when reflected beam is obtained again, the track which was being traced before interruption of the reflected beam can be caught correctly whereby a tracking error can be prevented.

If on/off means for the first servo loop is disposed outside of the second servo loop, vibration due to transient response of the actuator can be constantly reduced regardless of the on/off state of the first servo loop during search or tracking.

An embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
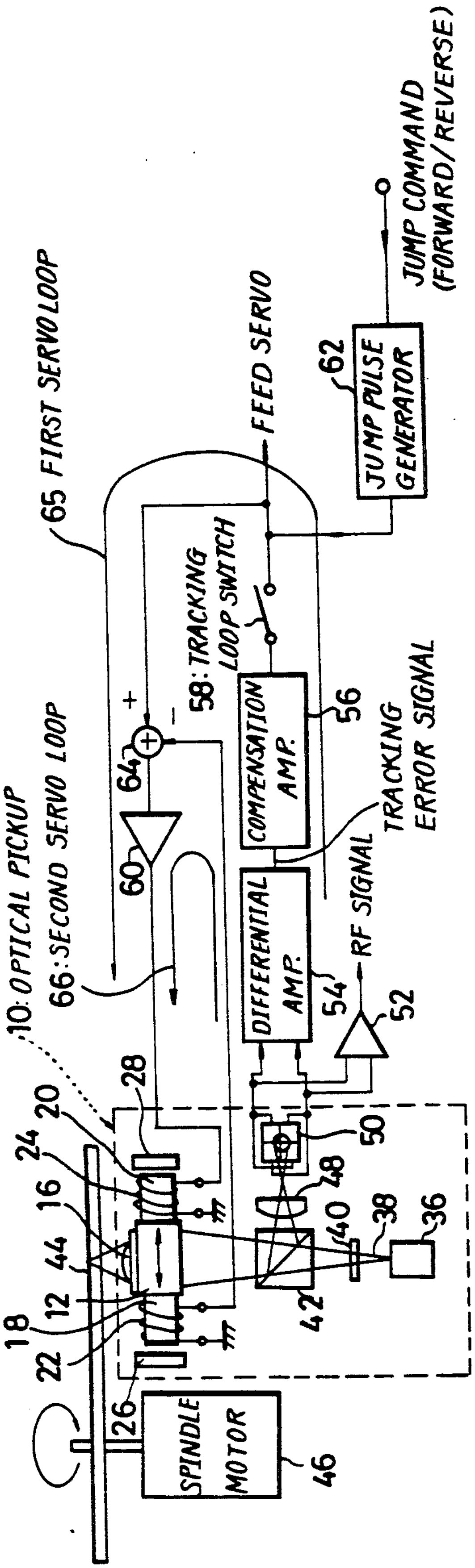
FIG. 1 is a block diagram showing an embodiment of the invention.

An embodiment of the invention is shown in FIG. 1. In this embodiment, this invention is applied to a driving circuit for a tracking actuator using the symmetrical drive type optical pickup 10 shown in FIG. 2. The same component parts as those of FIG. 3 are designated by the same reference characters.

Figure 2:
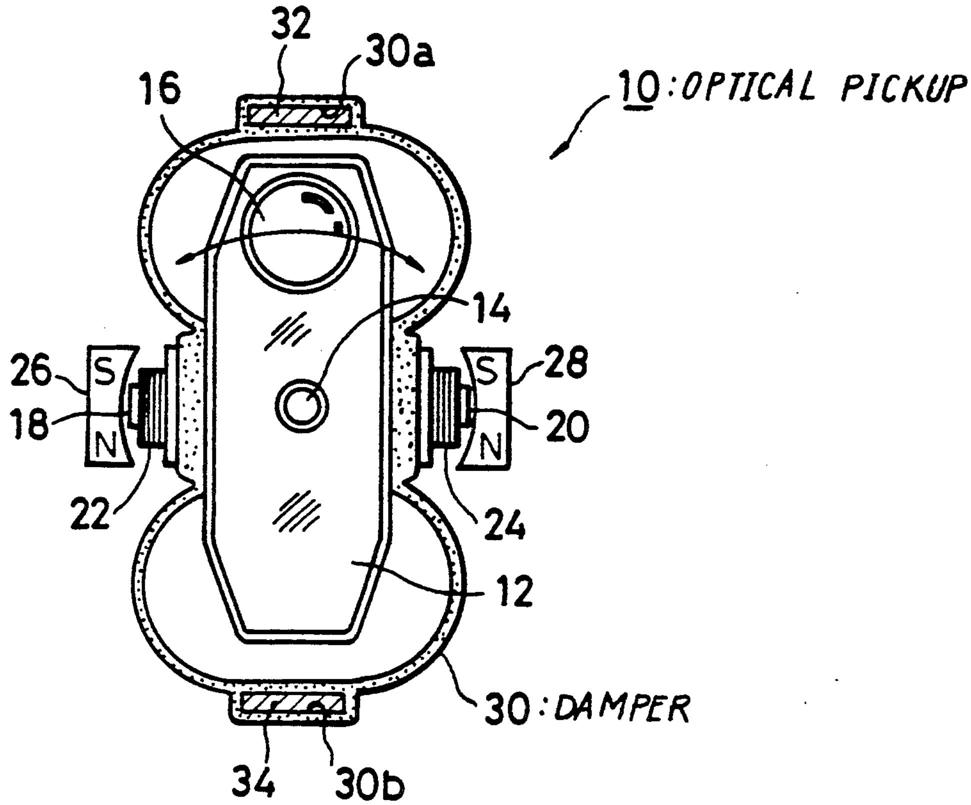
FIG. 2 is a plan view showing a prior art example of an optical pickup.
Figure 3:
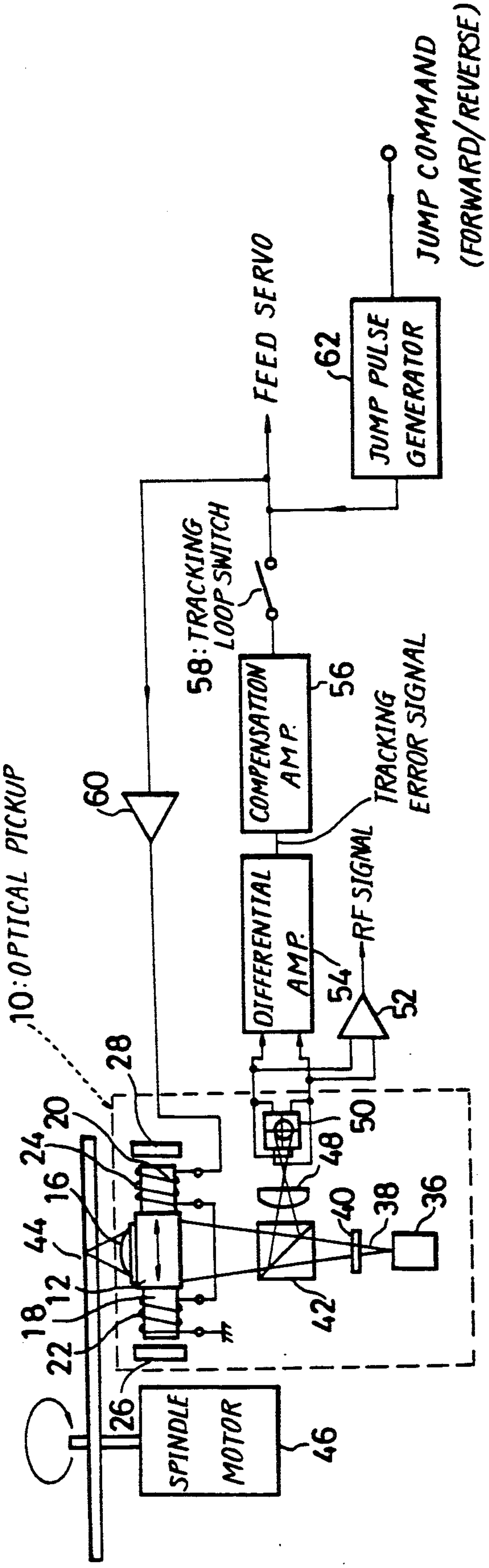
FIG. 3 is a block diagram showing a prior art device.
Figure 4:
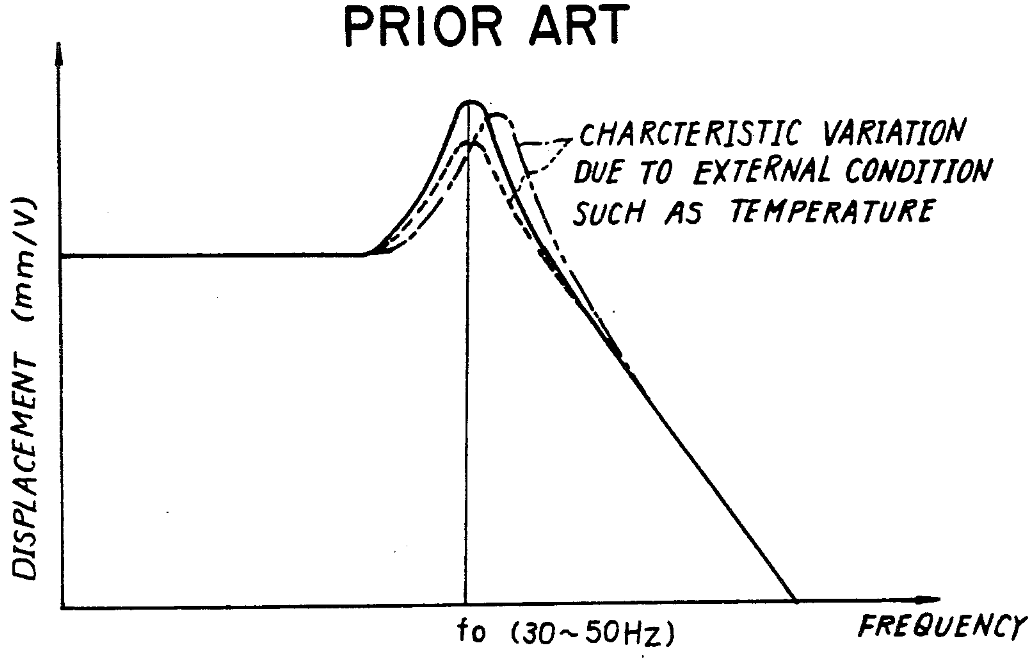
FIG. 4 is a characteristic diagram showing open loop frequency response in the prior art device.

Referring to FIG. 1, one coil 24 of coils 22 and 24 in the optical pickup 10 which are both used as the tracking coils in the device of FIG. 2 is used as a tracking coil and the other coil 22 is used as a coil for detecting the moving speed of the actuator. By this arrangement, the conventional symmetrical drive type optical pickup can be used without modification except for changing in wiring connections.

The optical pickup 10 radiates laser beam 38 produced by a laser diode 36 on the recorded surface of a disc 44 through a grating 40, a beam splitter 42 and an objective lens 16 and receives its reflected beam by a four split photo-detector 50 through the objective lens 16, beam splitter 42 and a cylindrical lens 48.

Outputs of the four split photo-detector 50 on diagonals are added together and the diagonal sum signals are further added together by an adder 52 to produce an RF signal and reproduction of a signal is thereby performed.

These diagonal sum signals are also supplied to a differential amplifier 54 and a tracking error signal is produced. A first servo loop (reflected beam servo loop) 65 is constructed in such a manner that the tracking error signal is supplied to the tracking coil 24 through a compensation amplifier 56, a tracking loop switch 58, an adder 64 and a drive amplifier 60 to pivot the lens support 12 and thereby cause the objective lens 16 to swing clockwise or counterclockwise to perform tracking control.

A second servo loop (speed servo loop) 66 is constructed in such a manner that induced voltage in the speed detection coil 22 is fed back to the adder 64 in the first servo (main servo) 65. If, accordingly, the lens support 12 tends to vibrate due to transient response, voltage corresonding to the speed of pivoting of the lens support 12 is induced in the speed detection coil 22. This induced voltage is fed back to the adder 64 to function to restrain the movement of the lens support 12. Thus, the vibration of the lens support 12 due to transient response is restrained.

The damper 30 of the optical pickup 10 (FIG. 2) has a function of the neutral point supporting of the lens support 12 and a function of attenuating vibration. Since, however, the function of attenuating vibration can be performed by the second servo loop 66, the provision of the damper 30 may be omitted if the lens support 12 can be otherwise supported at the neutral point.

Figure 5:
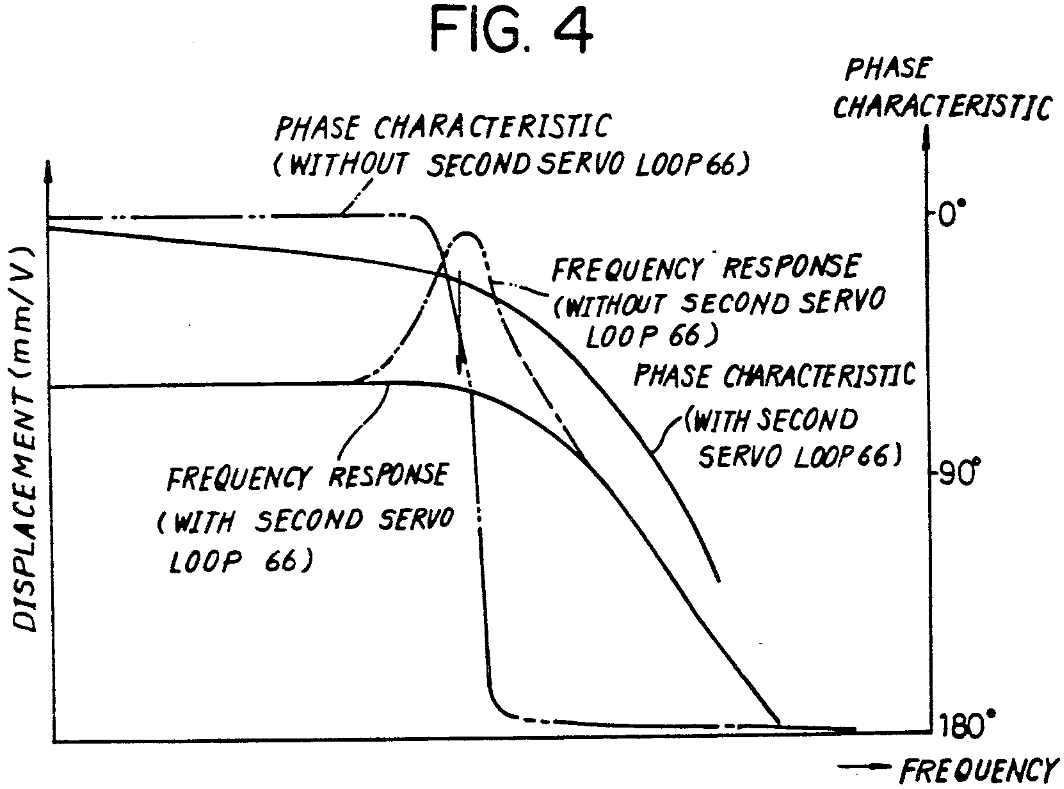
FIG. 5 is a characteristic diagram showing open loop frequency response and phase characteristic of the device shown in FIG. 1.

As to frequency response of the actuator (open loop), resonance characteristic is mitigated as shown in FIG. 5 owing to the provision of the second servo loop 66. Accordingly, the actuator becomes less susceptible to the external conditions such as ambient temperature and aging and an excellent frequency response can be constantly maintained.

As to phase characteristic (open loop), as shown in FIG. 5, the phase characteristic curve turns almost by 180 degrees in the vicinity of the resonance point in case there is no second servo loop 66 with resulting difficulty in realizing phase compensation whereas, in case there is the second servo loop 66, the phase characteristic curve turns gradually so that phase compensation can be accomplished more easily. Accordingly, even a rough design of phase compensation by the compensation amplifier 56 will suffice.

Further, even if reflected beam is not obtained due to scratch or dust on the recorded surface of the disc resulting in cutting off of the first servo loop 65, free vibration of the actutor is restrained because the second servo loop 66 constantly works and a correct track can be caught instantly when the first servo loop 65 is resumed whereby a tracking error can be prevented.

Since the tracking loop switch 58 is outside of the second servo loop 66, vibration of the actuator due to transient response can be restrained regardless of the on/off state of the first servo loop 65 during search and track jump.

In the above described embodiment, one of the coils of the symmetrical drive type tracking actuator is utilized as the speed detection coil. Alternatively, a sensor used exclusively for the speed detection purpose may be provided. This sensor is not limited to a magnetic type sensor but other type of sensor such as optical, piezoelectric or induction type may be used.

In the above described embodiment, the speed detection output of the actuator is fed back for the second servo loop. Alternatively, a position detection output of the actuator may be fed back for the second servo loop. For example, a similar effect can be obtained by providing a shutter plate on the actuator and the photo-electric detection means on the stationary side, obtaining voltage corresponding to the position of the actuator and feeding it back after matching the relative relationship of it with the input voltage. Alternatively, one electrode may be provided on the actuator side and the other electrode on the stationary side and a change of electrostatic capacity produced by spacing away of the actuator may be detected as voltage change.

In the above described embodiment, this invention is applied to the tracking control. The invention is also applicable to various other controls of an optical pickup including focus control and tangential control.

In the above described embodiment, this invention is applied to an optical pickup equipped with a damper. The invention is also applicable to an optical pickup without a damper.

The invention is also applicable to devices using an optical pickup other than CD, CD-V and LV players.

What is claimed is:

1. An optical pick-up actuator driving device comprising:

an actuator driving coil for moving an actuator of an optical pick-up;

a sensor for detecting velocity of said actuator;

a servo circuit for controlling a single parameter of operation of the actuator, the servo circuit including a first servo loop for feeding back a detection output of a reflected beam from a recording medium and a second servo loop for continuously feeding back a detection output of said sensor to said actuator driving coil when control of said single parameter is desired; and drive means for receiving the fed back detection outputs and providing a drive signal to the actuator in response thereto, whereby the second servo loop will control movement of the actuator even if the detection output of the recorded beam is lost.

2. A device as defined in claim 1 wherein the first servo loop is provided outside of the second servo loop and further comprising on/off means for turning on and off said first servo loop.

3. A device as defined in claim 1 wherein the actuator is contained in an optical disk system and wherein the single parameter of operation is tracking control.

* * * * *